United States Patent
Loveless

(10) Patent No.: US 11,787,457 B1
(45) Date of Patent: Oct. 17, 2023

(54) PALLET TRUCK WHEEL GUARD ASSEMBLY

(71) Applicant: GPS, Inc., Beaverton, OR (US)

(72) Inventor: Christopher Scott Loveless, Beaverton, OR (US)

(73) Assignee: GPS, Inc., Beaverton, OR (US)

( * ) Notice: Subject to any disclaimer, the term of this patent is extended or adjusted under 35 U.S.C. 154(b) by 0 days.

(21) Appl. No.: 17/706,453

(22) Filed: Mar. 28, 2022

(51) Int. Cl.
 *B62B 5/00* (2006.01)
 *B62B 3/06* (2006.01)

(52) U.S. Cl.
 CPC .............. *B62B 5/0006* (2013.01); *B62B 3/06* (2013.01)

(58) Field of Classification Search
 CPC . B62B 5/0006; B62B 5/0009; B62B 2203/20; B62B 2203/24; B62B 2203/26; B66F 9/075; B62D 25/161; B62D 25/163; B62D 25/168
 See application file for complete search history.

(56) References Cited

U.S. PATENT DOCUMENTS

| | | | | |
|---|---|---|---|---|
| 2,450,062 A * | 9/1948 | Voss | ....................... | B60B 33/00 280/160 |
| 3,036,651 A * | 5/1962 | Paul | ..................... | B62B 3/0612 280/43.12 |
| 3,555,793 A | 1/1971 | Chapman | | |
| 3,560,021 A * | 2/1971 | Watson | ................ | B62D 25/188 298/1 SG |
| 3,799,579 A * | 3/1974 | Dahl | ..................... | A01D 34/828 56/17.4 |
| 4,027,771 A * | 6/1977 | Adams | .................. | B62B 3/0625 280/43.12 |
| 4,996,832 A * | 3/1991 | McKeever | ........... | A01D 34/828 56/320.1 |
| 5,026,079 A * | 6/1991 | Donze | ...................... | B62B 1/22 280/47.33 |
| 5,113,960 A * | 5/1992 | Prinz | ..................... | B62B 3/0612 280/43.12 |
| 6,260,646 B1 * | 7/2001 | Fernandez | ............ | B62B 3/0612 280/43.23 |
| 7,267,349 B2 * | 9/2007 | Sica | ....................... | B60G 3/185 187/222 |
| 7,568,708 B2 * | 8/2009 | Vietri, Jr. | .............. | B62B 5/0006 280/43.12 |
| 10,850,759 B2 * | 12/2020 | Loveless | ............... | B62B 5/0006 |
| 2004/0188965 A1 * | 9/2004 | Feick | .................... | B62B 5/0006 280/47.131 |

(Continued)

*Primary Examiner* — Jeffrey J Restifo
(74) *Attorney, Agent, or Firm* — Schaffer IP Law, LLC

(57) ABSTRACT

A pallet truck wheel guard assembly is configured for use on a pallet truck of a type having a spaced pair of rear steer wheels rotatable about an axle residing and steerable within a horizontal plane relative to said pallet truck. The wheel guard assembly comprises a shroud having a width approximately equal to or larger than a spacing between rear steer wheels of a pallet truck. One or more connectors are configured to fixedly attach the shroud only to an axle between the steer wheels of the pallet truck, wherein the shroud is fixed relative to the steer wheels such that a spacing between a bottom edge of shroud and a floor level upon which the steer wheels rest is sufficiently narrow so as to prevent extremities from slipping beneath the shroud and be caught under the pallet jack wheels.

15 Claims, 4 Drawing Sheets

(56) References Cited

U.S. PATENT DOCUMENTS

| | | | | |
|---|---|---|---|---|
| 2005/0241889 | A1* | 11/2005 | Nebolon | B62B 3/14 |
| | | | | 188/19 |
| 2008/0122253 | A1* | 5/2008 | Knie | B66F 9/07527 |
| | | | | 296/181.1 |
| 2008/0164668 | A1* | 7/2008 | Feick | B62B 1/20 |
| | | | | 280/47.31 |
| 2008/0197589 | A1* | 8/2008 | Vietri | B62B 3/06 |
| | | | | 280/43.12 |
| 2017/0282947 | A1* | 10/2017 | Meyer | B62B 1/186 |
| 2019/0300037 | A1* | 10/2019 | Loveless | B62B 3/06 |
| 2020/0385041 | A1* | 12/2020 | Jiang | B62B 5/004 |
| 2021/0284220 | A1* | 9/2021 | Kahlig | B62B 5/0009 |

* cited by examiner

PALLET TRUCK WHEEL GUARD ASSEMBLY

BACKGROUND OF THE INVENTION

1. Field of the Invention

This application relates to pallet truck safety equipment, and in particular to wheel guards that act to prevent an operator's feet and toes from being caught under the wheel of the pallet truck during use.

2. Description of the Prior Art

Pallet trucks are used to lift, pull, push, and move loaded pallets. A pallet truck typically includes a frame with two forks extending forwardly of the frame. Extending behind the frame is an operator handle, by which the pallet truck may be maneuvered by a worker. At least one steer wheel is provided behind the frame, and is turnable by movement of the operator handle with the steer wheel(s) often close to the feet of a worker using the pallet truck. So configured, the direction and steering movement of the pallet truck is accomplished by a worker pulling or pushing the operator handle forwardly or backwardly and rotating the operator handle about its steering axis.

In operation, the forks of a pallet truck may first be positioned beneath a loaded pallet. By thereafter pivoting the operator handle downwardly, a lifting mechanism of the pallet truck causes the frame and forks to raise, thereby lifting the loaded pallet from the surface upon which it had rested. Various lifting mechanisms have been provided in the art, which cause the forks and frame to lift the weight of the loaded pallet so that the pallet may thereafter be transported upon the pallet truck. Part of the weight of the loaded pallet truck is borne by the steer wheel(s) at the rear of the pallet truck. So loaded, the pallet truck may be pulled and pushed to a second location, and the load thereafter lowered and removed from the forks.

Various embodiments of pallet trucks are known where at least one steer wheel is included at the rear of the pallet truck near the location at which the operator of such a pallet truck is positioned during use of the pallet truck. But use of a pallet truck with a rear steel wheel (or wheels) subjects the operator to the risk of running over their foot with the rear steer wheel as the operator pulls the pallet truck toward themselves, a maneuver required in the use of such a pallet truck. Particularly with loaded pallet trucks, that risk may cause great physical injury to the foot. An operator's foot may slip to the wheel(s) while trying to pull the pallet truck toward the operator, or an operator may allow his/her foot to remain too long in the path of a steer wheel of a pallet truck rolling backwards. Furthermore, the feet of nearby co-workers are also at risk of injury from the rolling of such rear steer wheels.

The danger posed by the steer wheels of heavily loaded pallet trucks has been addressed before, with most of these requiring a modification of the pallet jack steering column structure itself. And while Applicant has received U.S. Pat. No. 10,850,759 for a Pallet Truck Wheel Assembly Toe Guard that attaches outside of the pallet truck wheels and includes a sliding skirt attached to the protective shroud, the need exists for a streamlined design that simplifies the assembly while maintaining its effectiveness at preventing injury.

SUMMARY OF THE INVENTION

A first aspect of the invention describes a pallet truck wheel guard assembly for use on a pallet truck of a type having a spaced pair of rear steer wheels rotatable about an axle residing and steerable within a horizontal plane relative to said pallet truck. The wheel guard assembly comprises a shroud having a width approximately equal to or larger than a spacing between rear steer wheels of a pallet truck. One or more connectors are configured to fixedly attach the shroud only to an axle between the steer wheels of the pallet truck, wherein the shroud is fixed relative to the steer wheels such that a spacing between a bottom edge of shroud and a floor level upon which the steer wheels rest is sufficiently narrow so as to prevent extremities from slipping beneath the shroud and be caught under the pallet jack wheels. In a preferred implementation, this spacing is no more than 1" from a floor level upon which the steer wheels rest.

In another aspect of the invention, a pallet truck wheel assembly for use on a pallet truck is disclosed. The pallet truck wheel assembly configured for use on a pallet truck according to aspects of the invention comprises an axle extending in a horizontal plane. The axle includes an elongated shaft configured to couple perpendicularly along a lower end of a turning axis of a steering column of a pallet truck. The elongated shaft is configured to extend axially within a horizontal plane out either side of a steering column of a pallet truck and includes apertures defined within the axle on either side of the steering column. The assembly further includes a pair of rear steer wheels having center bores receiving and rotatable about the axle. The wheels are mounted on the axle in a spaced-apart configuration so that a central portion of the axle spaces the wheels apart between inboard portions of the steer wheels. The assembly further comprises a wheel guard coupled only to the central portion of the axle and includes a protective element that extends below the axle so that an operator's toes are prevented from sliding under the rear steer wheels of the pallet truck.

Yet another aspect of the invention describes a pallet truck, comprising a steering column coupled to a tow bar and defining a vertical steering axis. The pallet truck includes an axle coupled perpendicularly to the steering column and rotatable with the steering column about the vertical steering axis. A pair of rear steer wheels is carried on and spaced apart along the axle and defines an axis of rotation and a width of the rear steer wheels, where the axis of rotation resides in a horizontal plane and is turnable in the plane relative to the pallet truck. The pallet truck further includes a steer wheel toe guard that is carried solely by the axle and turnable with the steering column. The toe guard is disposed behind the rear steer wheels and defines a length parallel to the axis of rotation, with the toe guard length approximating the width of the rear steer wheels. The toe guard further defines a height perpendicular to its length, where the height extends below the plane of the axis of rotation behind the rear steer wheel.

In preferred embodiments, the protective element is a plate that is carried by and spaced rearwardly from the axle by spacers coupled on either side of the steering column. The spacers include an axial aperture that receive bolts therethrough and couple on terminal ends to the plate and axle, respectively.

The foregoing and other objects, features and advantages of the invention will become more readily apparent from the following detailed description of a preferred embodiment of the invention that proceeds with reference to the accompanying drawings.

DETAILED DESCRIPTION

Figure 1:
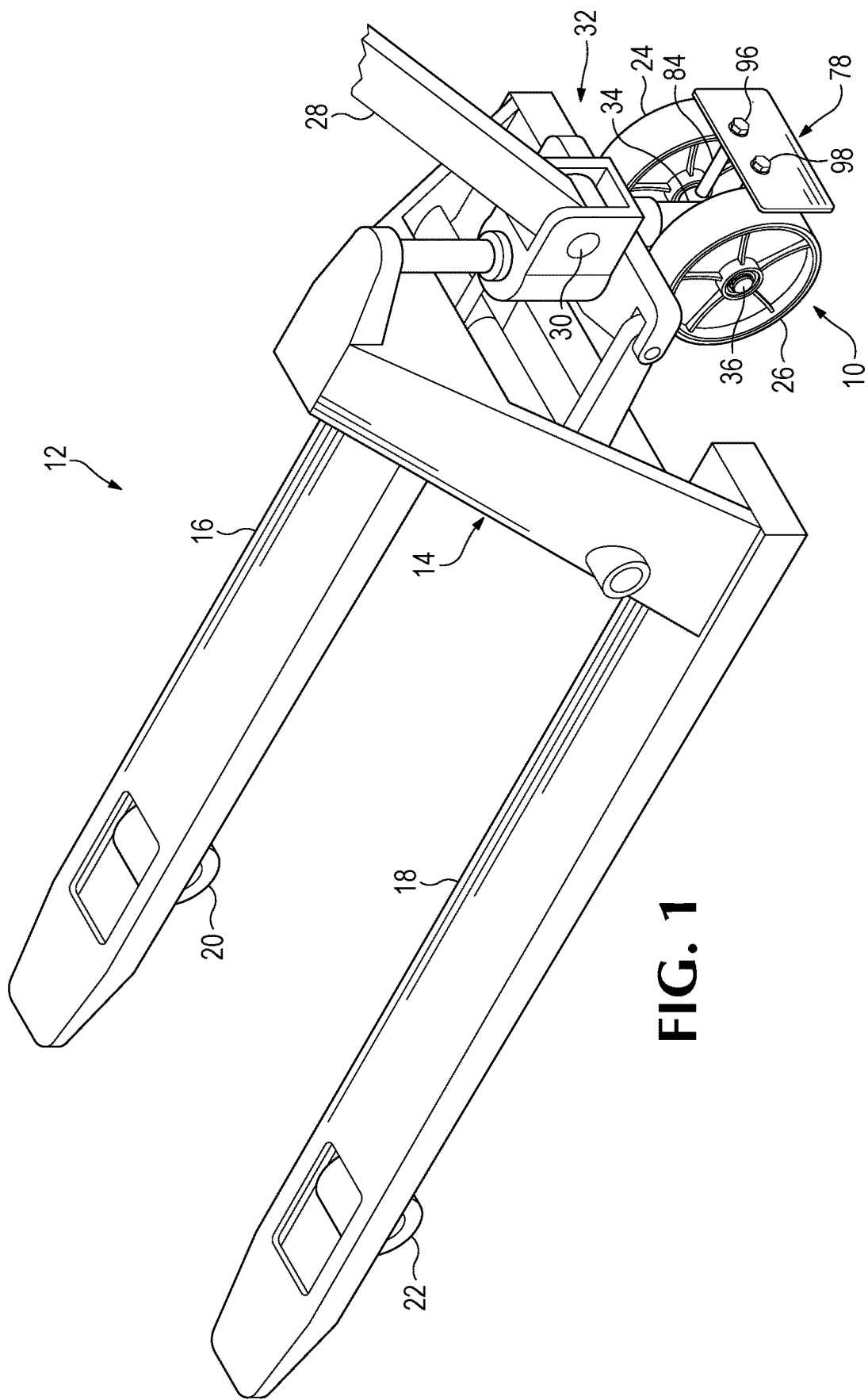
FIG. 1 is a perspective view of a pallet truck using a wheel guard assembly configured according to a preferred embodiment of the invention.

FIG. 1 illustrates a wheel guard assembly 10 installed for use with an embodiment of a pallet truck 12. The pallet truck 12 includes an A-frame 14 at the rear of the pallet truck 12, and forks 16, 18 extending forwardly from such frame. Forks 16, 18 may be rolled beneath a load as via load rollers 20, 22 at the front of the pallet truck 12 and steer wheels 24, 26 located at the back of the pallet truck. An operator would then pivot tow bar or handle 28 up and down about handle pivot pin 30 to thereby cause frame 14 and forks 16, 18 to raise, thereby also raising a load mounted atop the forks 16, 18.

As shown in FIG. 1, the pallet truck configured according to the current invention includes a pair of steer wheels 24, 26 at the rear of the pallet truck 12. By moving tow bar 28 side-to-side, steer wheels 24, 26 are caused to turn about a vertical steering axis, thereby allowing for steering of pallet truck 12. Operation of pallet truck 12 requires that an operator lift, steer, push, and pull upon tow bar 28. To do so, the operator's feet are often positioned near the steer wheels 24, 26 and thus in danger of rolling under the wheels and being crushed by the weight of the load carried by the pallet truck 12. The wheel guard assembly 10 is configured to prevent an operator's toes from sliding under the wheels during manipulation of the pallet truck 12 and thus prevent injury.

Figure 3:
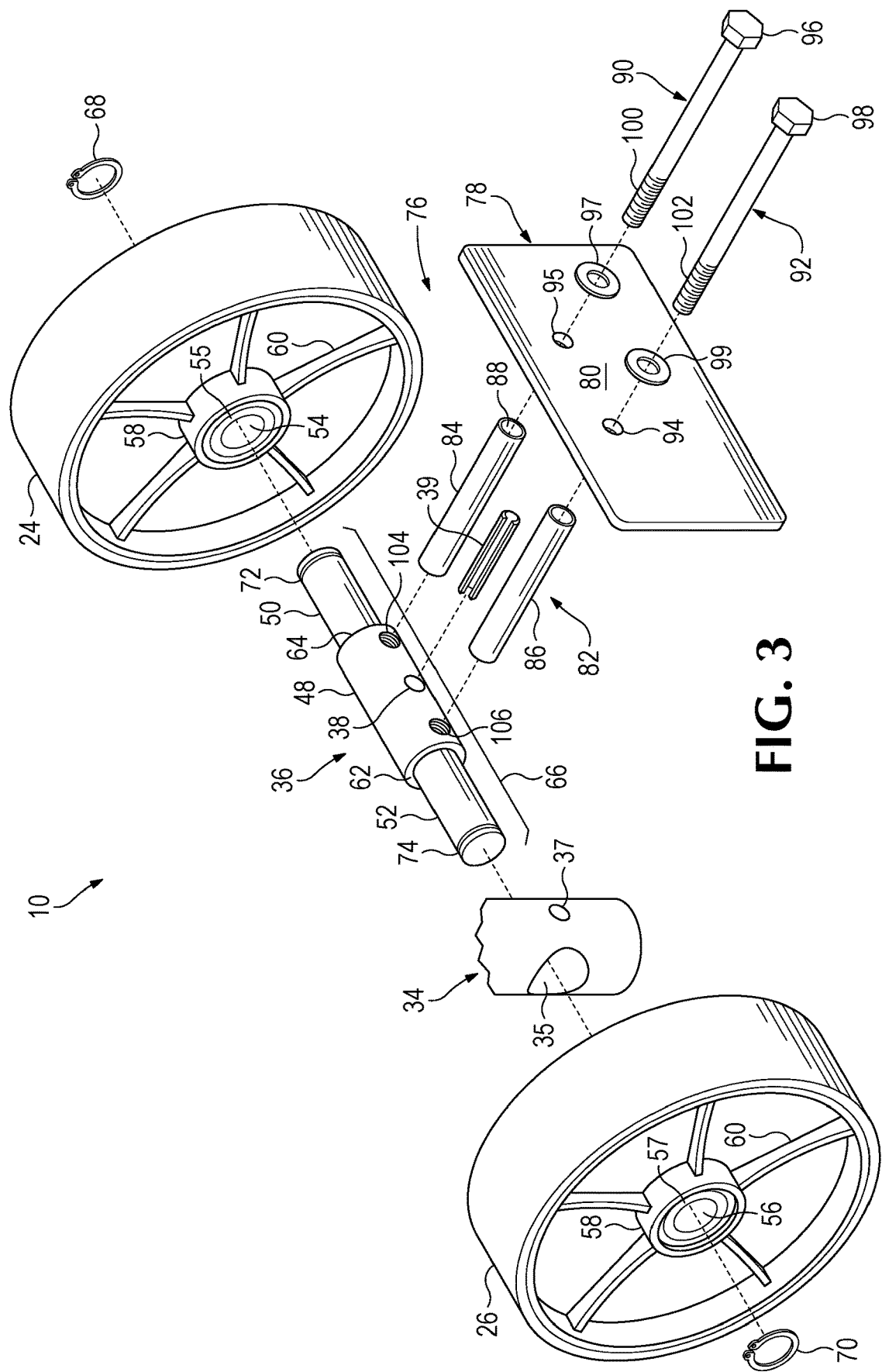
FIG. 3 is an exploded perspective view of the wheel guard assembly of FIG. 1.

Arcing movement of the pallet truck 12 is accomplished by way of a steering assembly 32 coupled rearwardly of A-frame 14. Steering assembly 32 includes a vertically-mounted steering column 34 coupled to the tow bar 28 and depending downward from A-frame 14 that defines a vertical steering axis around which tow bar 28 rotates. As shown in FIG. 3, the steering column 34 includes a large bore aperture 35 defined through a lower portion of the steering column, and a small bore aperture 37 defined through the same lower portion and aligned with the tow bar 28 but perpendicular to the large bore aperture 35. An axle 36 is received through the large bore aperture 35 of steering column 34 and coupled thereto via a spring pin 39 that is itself received through both the small bore aperture 37 of the steering column and axially aligned connecting aperture 38 (FIG. 3) formed in the axle 36 perpendicularly to a long axis 40 of the axle. Axle 36 is configured to carry steer wheels 24, 26 and is rotatable with the steering column 34 about the vertical steering axis. Swinging tow bar 28 side-to-side around this vertical steering axis thus causes steering column 34 to turn steer wheels 24, 26 as they move in an arc defined by the turning of the tow bar 28 and associated steering assembly 32.

Figure 2:
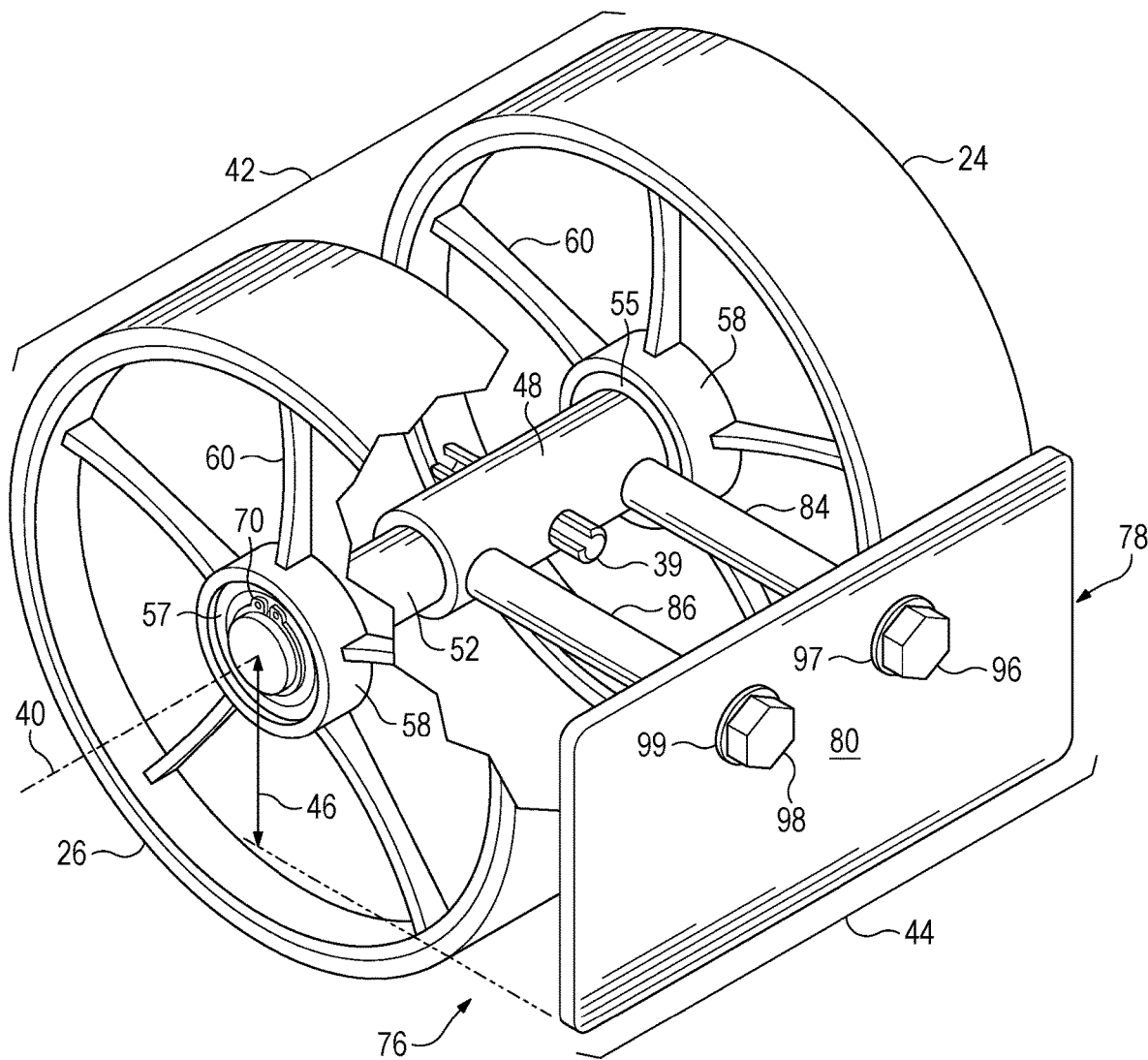
FIG. 2 is a magnified perspective view of the wheel guard assembly of FIG. 1 in partial cutaway.

Turning also to FIG. 2, the rear steer wheels 24, 26 are spaced apart and combine to form a rear steer wheel width 42 with a defined axis of rotation about the long axis 40 of the axle that is residing and turnable within in a horizontal plane relative to the pallet truck 12. The steer wheel guard 10 is mounted so that it is carried solely by the axle 36 and turnable with the steering column 34 as described further below. The wheel guard 10 defines a length 44 that approximates the width 42 of the rear steer wheels, but is at least equal to or greater than width 42 so as to properly protect an operator's toes from sliding beneath wheels 24, 26. The wheel guard 10 further extends below the axis 40 of the steer wheels by a height 46 that is perpendicular to the toe guard length 44 and extends behind the rear steer wheels 24, 26 and below the plane of their axis of rotation 40.

Turning also to FIG. 3, the wheel guard assembly axle 36 extends in a horizontal plane along wheel rotation axis 40. Axle 36 includes a central portion 48 configured to be received and couple within the large aperture bore 35 of the steering column 34 via steering pin 39, where the steering pin locks the axle within the steering column when it is received through aligned steering column aperture 37 and axle aperture 38. Axle 36 includes shoulders 50, 52 located at each terminal end thereof outboard of the central portion 48. Rear steer wheels 24, 26 are rotatable about the axle 36 via respective bores 54, 56 located centrally about a wheel hub 58 and spoke 60 system. The central axle portion 48 is preferably structured with a larger diameter than the shoulders 50, 52 and bores 54, 56. It is understood that bores 54, 56 can be the central axial opening through the wheels themselves or, more likely, a press-fit bearing 55, 57 fitted within this central axial opening and defining its own central bore (here shown as bore 54, 56) that receives the axle 36 therethrough. In this configuration, the bores 54, 56 may receive respective axle shoulders 50, 52 and slide along the axle 36 up to the central portion 48, e.g. adjacent rising and falling edges 62, 64, so that inboard portions of the wheels 24, 26 are maintained in spaced apart configuration by these edges 62, 64 and separated by the width of the axle central portion 48. The total length 66 of the steer wheel axle 36 is approximately equal to (but actually slightly larger than) the width 42 of the steer wheels and central portion 48 together so that the shoulders 50, 52 of the axle extend just outside of each outboard portion of the steer wheels 24, 26 when the wheel assembly is combined as shown in FIG. 2.

The rear steer wheels 24, 26 of the pallet truck wheel assembly 10 are retained in spaced apart position on axle 36 via contact of the wheel hubs 58 or bearings 55, 57 with central axle edges 62, 64 on the inboard sides of the wheels, and via contact with snap rings 68, 70 on outboard sides of the wheels. The axle 36 includes annular grooves 72, 74 defined on distal portions of the axle shoulders 50, 52 that extend outside the outboard portions of the steer wheels when assembled and receive respective snap rings 68, 70 therein. The snap rings 68, 70 have a greater diameter than the wheel central bores 54, 56 so that the wheels are retained in position on the axle between the central portion 48 of the axle 36 and the snap rings 68, 70.

Attention is now directed to the wheel guard portion 76 of the toe guard wheel assembly 10, which is coupled only to and carried only by a portion of the axle 36 between where the axle is received within the steering column 34 and the axle shoulders 50, 52. The wheel guard 76 includes a protective element that extends along but is spaced from the back of the wheels 24, 26 and below the axle 36 and wheel rotation axis 40 so that an operator's toes are prevented from sliding under the rear steer wheels of the pallet truck. In the embodiment shown, the protective element comprises a shroud or plate 78 coupled to the axle central portion 48 and having a outer face 80 disposed behind the wheels. Plate 78 preferably has a width 44 that is approximately equal to or larger than a spacing 42 between rear steer wheels of a pallet truck.

Plate 78 and axle 36 are fixedly coupled together via one or more connectors 82. In a preferred implementation of this, and as shown in the drawings, the connectors include a pair of elongated spacers 84, 86 configured to be positioned between the plate 78 and axle 36 of the pallet truck that fix the wheel guard plate 78 a predetermined distance from the axle 36 such that the plate 78 does not bear against the rear steer wheels 24, 26 of the wheel assembly 10. Each of the elongated spacers 84, 86 include an axial hole (e.g. aperture 88) sized to receive respective connectors such as bolts 90, 92. Bolts 90, 92 are inserted through respective holes 94, 95 formed through plate 78 and received through respective spacer apertures 88. The bolts 90, 92 are sized with a desired length to allow respective bolt heads 96, 98 to bear against the outside surface 80 of plate 78 (or against interposed washers 97, 99) and the terminal threaded ends 100, 102 be received within complementary threaded holes 104, 106 formed on the central portion 48 of axle 36. Threaded holes 104, 106 are preferably defined within the same horizontal plane as the long axis 40 of axle 36. The diameter of the spacers 84, 86 is larger than that of the wheel guard plate holes 94, 95 and of the threaded holes 104, 106 in the axle such that terminal ends of the elongated spacers contact opposed sides of the protective element and axle and fix the protective element a predetermined distance from the axle such that the protective element does not bear against the rear steer wheels of the pallet truck. Furthermore, the pair of holes 94, 95 defined through the protective element 78 of the wheel guard 10 are spaced identically to a spacing between the apertures 104, 106 defined within the axle 48 on either side of the steering column 34. The apertures 104, 106 are therefore minimally spaced more than a diameter of the steering column 34 so that a respective aperture 104, 106 is on each side of the steering column, but less than a spacing between the axle shoulders 50, 52.

Figure 4:
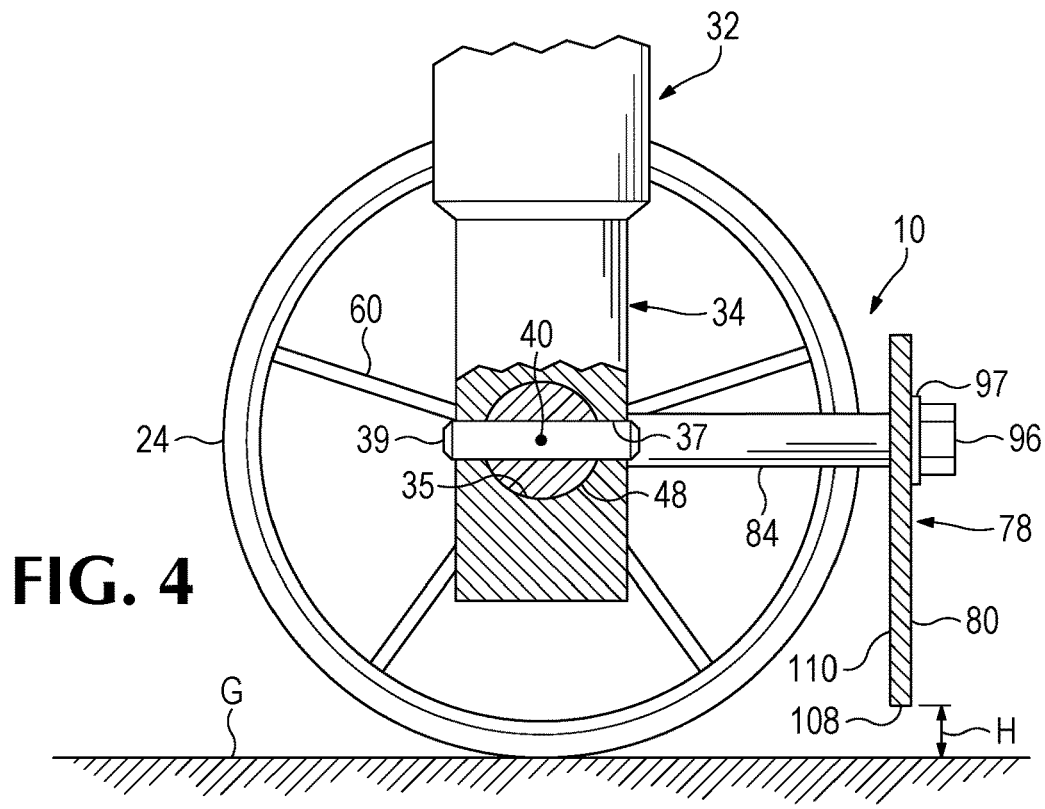
FIG. 4 is a side elevation, sectional view of the wheel guard assembly taken along line 4-4 in FIG. 5.
Figure 5:
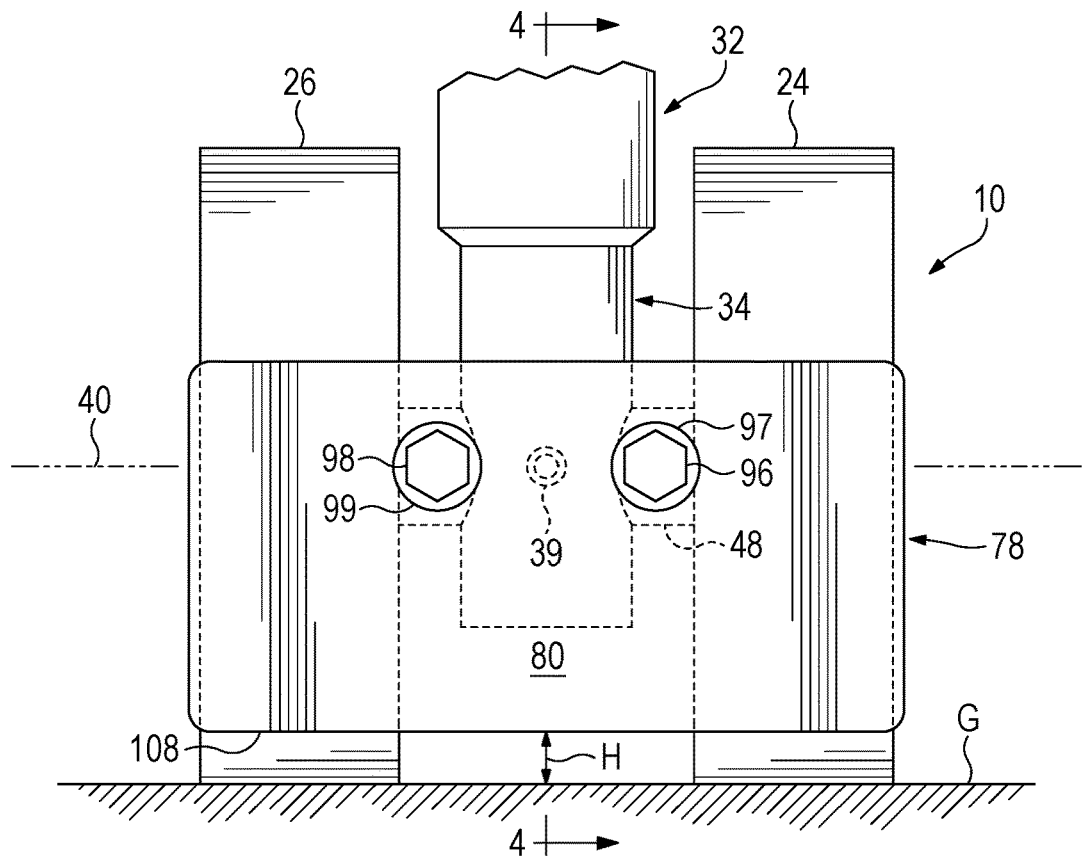
FIG. 5 is a rear elevation view of the wheel guard assembly.

FIGS. 4 and 5 illustrate side and front elevation views of the pallet truck wheel assembly 10. At least a portion of the protective element, e.g. plate 78, extends below the long axis 40 of the axle 48 so that an operator's toes are prevented from sliding under the rear steer wheels of the pallet truck. In a preferred embodiment, this spacing or distance H from the ground to the lower edge 108 of plate 78 is 1" or less. The spacers, e.g. spacer 84 in FIG. 4 is shown bearing against an inside surface 110 of protective plate 78 on one terminal end and against the central portion 48 of axle 36 on the opposite terminal end of the spacer 84. Plate 78 is therefore suspended a fixed distance from central portion 48 of axle 36 such that the plate does not bear against the rear steer wheels, e.g. wheel 24, of the pallet truck 12. Plate 78 is then captured between bolt head and washer, e.g. head 96 and washer 97, and the spacer, e.g. spacer 84.

Having described and illustrated the principles of the invention in a preferred embodiment thereof, it should be apparent that the invention can be modified in arrangement and detail without departing from such principles. As an alternate design, for instance, additional elements can be added to the axle so that no added apertures (e.g. apertures 104, 106) on the axle 36 would be necessary to couple the plate 78 to the axle. An example of this alternate design would be slip rings that would be slid onto the axle central portion 48 on either side of where the axle is received within the steering column 34. These slip rings would include a female threaded aperture for receiving the male threaded ends 100, 102 of bolts 90, 92 and act as a set screw and anchor point for the wheel guard. This would mitigate any possible weakening of the wheel axle 36 that may result from adding holes to the structure. However, tests have shown that the added holes as present in the preferred design would not weaken the axle structure beyond normal capacity requirements. We claim all modifications and variation coming within the spirit and scope of the following claims.

What is claimed is:

1. A pallet truck wheel guard assembly for use on a pallet truck of a type having a spaced pair of rear steer wheels rotatable about an axle residing and steerable within a horizontal plane relative to said pallet truck, the wheel guard assembly comprising:
    a shroud having a width approximately equal to or larger than a spacing between rear steer wheels of a pallet truck; and
    one or more connectors configured to fixedly attach the shroud only to an axle between the steer wheels of the pallet truck;
    wherein the shroud is fixed relative to the steer wheels such that a spacing between a bottom edge of shroud and a floor level upon which the steer wheels rest is sufficiently narrow so as to prevent extremities from slipping beneath the shroud and be caught under the pallet jack wheels, where the one or more connectors includes:
    an elongated spacer having an axial hole therethrough and configured to be positioned between the shroud and axle of the pallet truck; and
    a bolt received through an aperture within the shroud and axial hole through the spacer, with a terminal end of said bolt being configured to be received within an aperture on the axle and a terminal end of the elongated spacer configured to bear against an outside of the axle and fix the shroud a predetermined distance from the axle such that the shroud does not bear against the rear steer wheels of the pallet truck.

2. A pallet truck wheel guard assembly for use on a pallet truck of a type having a spaced pair of rear steer wheels rotatable about an axle residing and steerable within a horizontal plane relative to said pallet truck, the wheel guard assembly comprising:
    a shroud having a width approximately equal to or larger than a spacing between rear steer wheels of a pallet truck; and
    one or more connectors configured to fixedly attach the shroud only to an axle between the steer wheels of the pallet truck;
    wherein the shroud is fixed relative to the steer wheels such that a spacing between a bottom edge of shroud and a floor level upon which the steer wheels rest is sufficiently narrow so as to prevent extremities from slipping beneath the shroud and be caught under the pallet jack wheels, wherein the axle is received through a steering column of the pallet truck, and where the one or more connectors includes:
    a pair of elongated spacers, each having an axial hole therethrough and configured to be positioned between the shroud and axle of the pallet truck; and
    a pair of bolts, with each of the pair of bolts being received through a respective aperture within the shroud and axial hole through the spacer, with a terminal end of each of said bolts being configured to be received within respective apertures on the axle spaced on either side of a steering column such that terminal ends of the elongated spacers contact opposed sides of the shroud and axle and fix the shroud a predetermined distance from the axle such that the shroud does not bear against the rear steer wheels of the pallet truck.

3. The pallet truck wheel guard assembly of claim 2, wherein the terminal end of each of the bolts is threaded and configured to be received within respective threaded apertures on the axle.

4. A pallet truck wheel assembly for use on a pallet truck, the wheel assembly comprising:
   an axle extending in a horizontal plane and including:
      an elongated shaft configured to couple perpendicularly along a lower end of a turning axis of a steering column of a pallet truck, said elongated shaft configured to extend axially within a horizontal plane out either side of a steering column of a pallet truck; and
      apertures defined within the axle on either side of the steering column;
   a pair of rear steer wheels having center bores receiving and rotatable about the axle, said wheels mounted on the axle in a spaced-apart configuration so that a central portion of the axle spaces the wheels apart between inboard portions of the steer wheels;
   a wheel guard coupled only to the central portion of the axle and having a protective element that extends below the axle so that an operator's toes are prevented from sliding under the rear steer wheels of the pallet truck.

5. The pallet truck wheel assembly of claim 4, wherein the wheel guard is coupled only to the apertures of the axle.

6. The pallet truck wheel assembly of claim 5, wherein the apertures are defined within the horizontal plane of the axle.

7. The pallet truck wheel assembly of claim 4, further including a pair of elongated spacers configured to fix the wheel guard a predetermined distance from the axle such that the wheel guard does not bear against the rear steer wheels of the wheel assembly.

8. The pallet truck wheel assembly of claim 7, wherein each of the pair of elongated spacers include an axial hole therethrough and configured to be positioned between the protective element of the wheel guard and axle of the wheel assembly.

9. The pallet truck wheel assembly of claim 8, further including:
   a pair of holes defined through the protective element of the wheel guard and spaced identically to a spacing between the apertures defined within the axle on either side of the steering column; and
   a pair of bolts with each of the pair of bolts being received through a respective one of the protective element holes, through the axial hole of a respective one of the elongated spacers, and to a respective one of the apertures of the axle, with a terminal end of each of said bolts being configured to be received within respective apertures on the axle spaced on either side of a steering column such that terminal ends of the elongated spacers contact opposed sides of the protective element and axle and fix the protective element a predetermined distance from the axle such that the protective element does not bear against the rear steer wheels of the pallet truck.

10. The pallet truck wheel assembly of claim 9, wherein the apertures defined within the axle and the terminal end of each of the bolts are threaded, with each of the bolts being configured to be received within respective threaded apertures on the axle.

11. A pallet truck, comprising:
   a steering column coupled to a tow bar and defining a vertical steering axis;
   an axle coupled perpendicularly to the steering column and rotatable with the steering column about the vertical steering axis;
   a pair of rear steer wheels carried on and spaced apart along the axle and defining an axis of rotation and a width of said rear steer wheels, said axis of rotation residing in a horizontal plane and turnable in said plane relative to said pallet truck;
   a steer wheel toe guard, said steer wheel toe guard:
      carried solely by said axle between the rear steer wheels and turnable with said steering column;
      disposed behind said rear steer wheels;
      defining a length parallel to said axis of rotation, with said toe guard length approximating said width of said rear steer wheels; and
      defining a height perpendicular to said length, said height extending below said plane of said axis of rotation behind said rear steer wheels, further including apertures defined within the axle on either side of the steering column.

12. The pallet truck of claim 11, wherein the apertures are defined within the horizontal plane of the axle.

13. A pallet truck, comprising:
   a steering column coupled to a tow bar and defining a vertical steering axis;
   an axle coupled perpendicularly to the steering column and rotatable with the steering column about the vertical steering axis;
   a pair of rear steer wheels carried on and spaced apart along the axle and defining an axis of rotation and a width of said rear steer wheels, said axis of rotation residing in a horizontal plane and turnable in said plane relative to said pallet truck;
   a steer wheel toe guard, said steer wheel toe guard:
      carried solely by said axle between the rear steer wheels and turnable with said steering column;
      disposed behind said rear steer wheels;
      defining a length parallel to said axis of rotation, with said toe guard length approximating said width of said rear steer wheels; and
      defining a height perpendicular to said length, said height extending below said plane of said axis of rotation behind said rear steer wheels, further including a pair of elongated spacers configured to fix the steer wheel toe guard a predetermined distance from the axle such that the steer wheel toe guard does not bear against the rear steer wheels of the wheel assembly.

14. The pallet truck of claim 13, wherein each of the pair of elongated spacers include an axial hole therethrough and configured to be positioned between the steer wheel toe guard and axle.

15. The pallet truck of claim 14, further including a pair of bolts, with each of the pair of bolts being received through a respective one of the axial hole of a respective one of the pair of elongated spacers, and to a respective one of the apertures of the axle, with a terminal end of each of said bolts being configured to be received within a respective one of the apertures on the axle spaced on either side of the steering column such that terminal ends of the elongated spacers contact opposed sides of the steer wheel toe guard and axle and fix the protective element a predetermined distance from the axle such that the steer wheel toe guard does not bear against the rear steer wheels of the pallet truck.

\* \* \* \* \*